(12) United States Patent
Omoda et al.

(10) Patent No.: US 8,199,961 B2
(45) Date of Patent: Jun. 12, 2012

(54) SPEAKER DEVICE, INSTALLATION BODY FOR SPEAKER DEVICE, AND MOBILE BODY HAVING SPEAKER DEVICE MOUNTED THEREON

(75) Inventors: Manabu Omoda, Kanagawa-ken (JP); Masahiro Watanabe, Kanagawa-ken (JP)

(73) Assignee: JVC Kenwood Corporation, Yokohama-shi, Kanagawa (JP)

( * ) Notice: Subject to any disclaimer, the term of this patent is extended or adjusted under 35 U.S.C. 154(b) by 1155 days.

(21) Appl. No.: 11/988,722

(22) PCT Filed: Jul. 12, 2006

(86) PCT No.: PCT/JP2006/313877
§ 371 (c)(1),
(2), (4) Date: Jan. 14, 2008

(87) PCT Pub. No.: WO2007/010800
PCT Pub. Date: Jan. 25, 2007

(65) Prior Publication Data
US 2009/0154757 A1    Jun. 18, 2009

(30) Foreign Application Priority Data
Jul. 15, 2005 (JP) ................. 2005-207778

(51) Int. Cl.
*H04R 1/02* (2006.01)
*H04R 9/08* (2006.01)
*H04R 25/00* (2006.01)
*H04R 5/02* (2006.01)
*H04R 9/06* (2006.01)
*H04R 11/04* (2006.01)
*H04R 17/02* (2006.01)
*H04R 19/04* (2006.01)
*H04R 21/02* (2006.01)
*H04B 1/00* (2006.01)

(52) U.S. Cl. ............ 381/389; 381/86; 381/87; 381/189; 381/302; 381/332; 381/334; 381/335; 381/336; 381/359; 381/386; 381/387

(58) Field of Classification Search ............. 381/86–87, 381/189, 302, 332, 334–336, 359, 386–387, 381/389
See application file for complete search history.

(56) References Cited

U.S. PATENT DOCUMENTS 3,276,538 A * 10/1966 Guyton et al. ............... 181/141
4,445,228 A *  4/1984 Bruni ........................... 381/302
5,008,944 A *  4/1991 Sels et al. ..................... 381/86

(Continued)

FOREIGN PATENT DOCUMENTS

DE    849 253 C    9/1952

(Continued)

*Primary Examiner* — Ida M Soward
(74) *Attorney, Agent, or Firm* — The Nath Law Group; Jerald L. Meyer; Stanley N. Protigal

(57) ABSTRACT

A speaker device (100) includes a speaker unit (2) including a diaphragm (6); a windshield cover (3) covering the speaker unit and including a sound emitting unit (130) emitting a sound produced by the speaker unit; and a cabinet (5) connected to a bottom of the windshield cover, and supporting the speaker unit so as to form an angle equal to or greater than 0 degree and equal to or smaller than 90 degree between a vibration direction X of the diaphragm and the sound emitting unit.

13 Claims, 21 Drawing Sheets

U.S. PATENT DOCUMENTS

| | | | |
|---|---|---|---|
| 5,646,381 A * | 7/1997 | Boyte, Jr. | 181/141 |
| 5,802,193 A * | 9/1998 | Kieltyka | 381/386 |
| 5,979,590 A * | 11/1999 | Telmos | 181/141 |
| 6,127,919 A * | 10/2000 | Wylin | 340/425.5 |
| 6,298,943 B1 | 10/2001 | Yamada et al. | |
| 6,580,801 B1 * | 6/2003 | Takagi et al. | 381/387 |
| 6,647,121 B2 * | 11/2003 | Stanberry et al. | 381/86 |
| 6,752,366 B2 * | 6/2004 | Chuang | 248/220.21 |
| 6,768,219 B2 * | 7/2004 | Konno | 307/9.1 |
| 7,076,279 B2 * | 7/2006 | Tabata et al. | 455/575.2 |
| 7,464,952 B2 * | 12/2008 | Stigger | 280/288.4 |
| 7,853,026 B2 * | 12/2010 | DeLine et al. | 381/86 |
| 2005/0123148 A1 * | 6/2005 | Ohler | 381/86 |

FOREIGN PATENT DOCUMENTS

| | | |
|---|---|---|
| JP | 61-110489 U | 7/1986 |
| JP | 62-52586 U | 4/1987 |
| JP | 8-195996 A | 7/1996 |
| JP | 10-243488 A | 9/1998 |
| JP | 2000-228793 A | 8/2000 |

* cited by examiner

FIG. 14
(a)
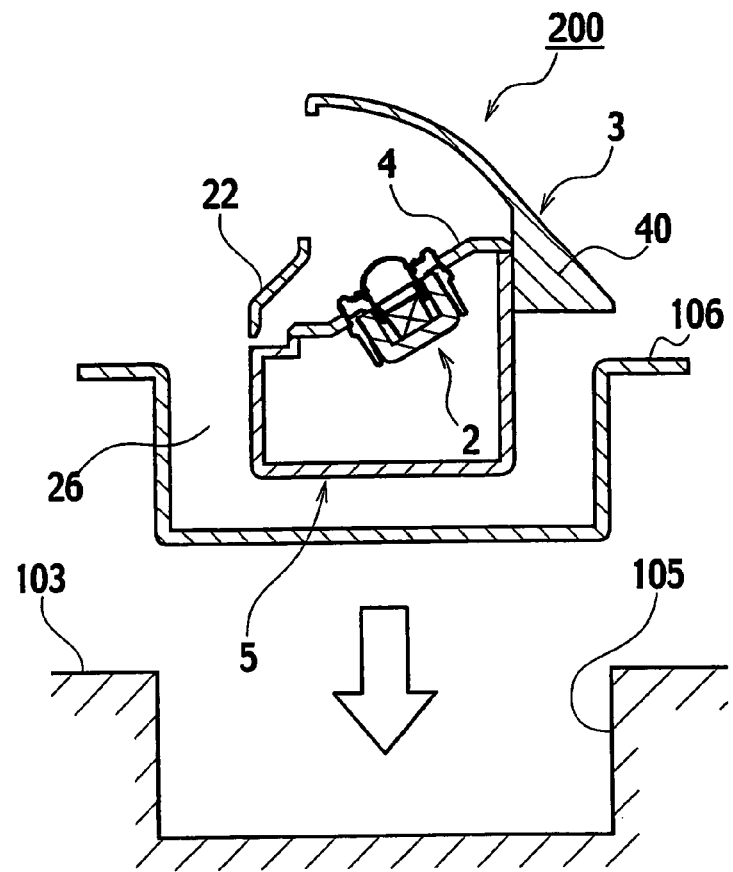
(b)
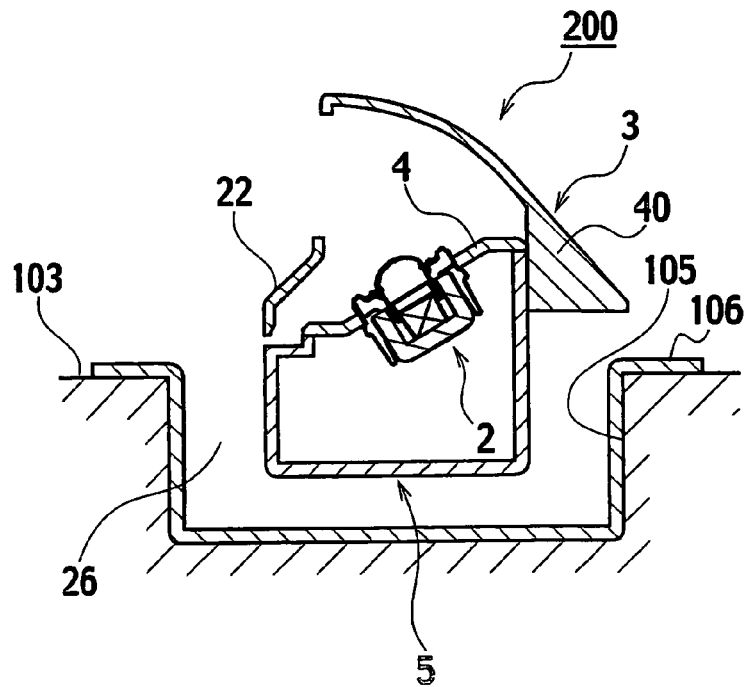

FIG. 18
(a)
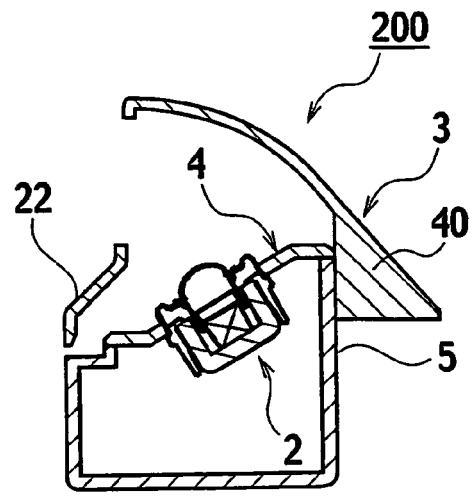
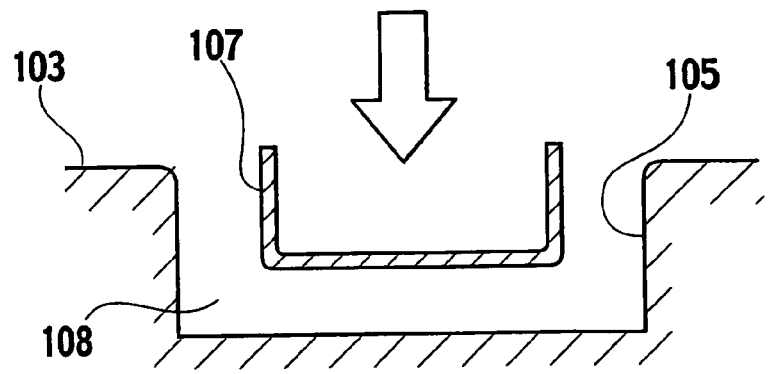
(b)
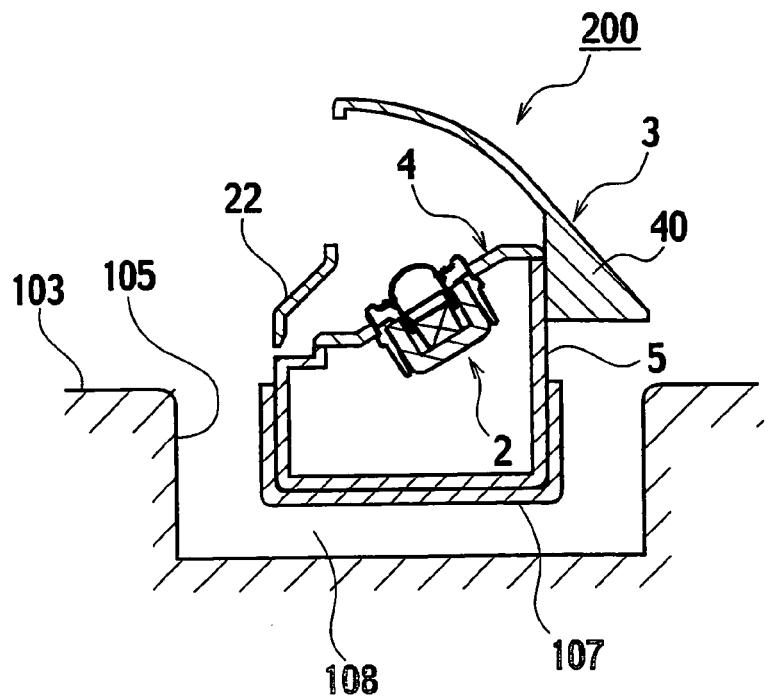

FIG. 19
(a)
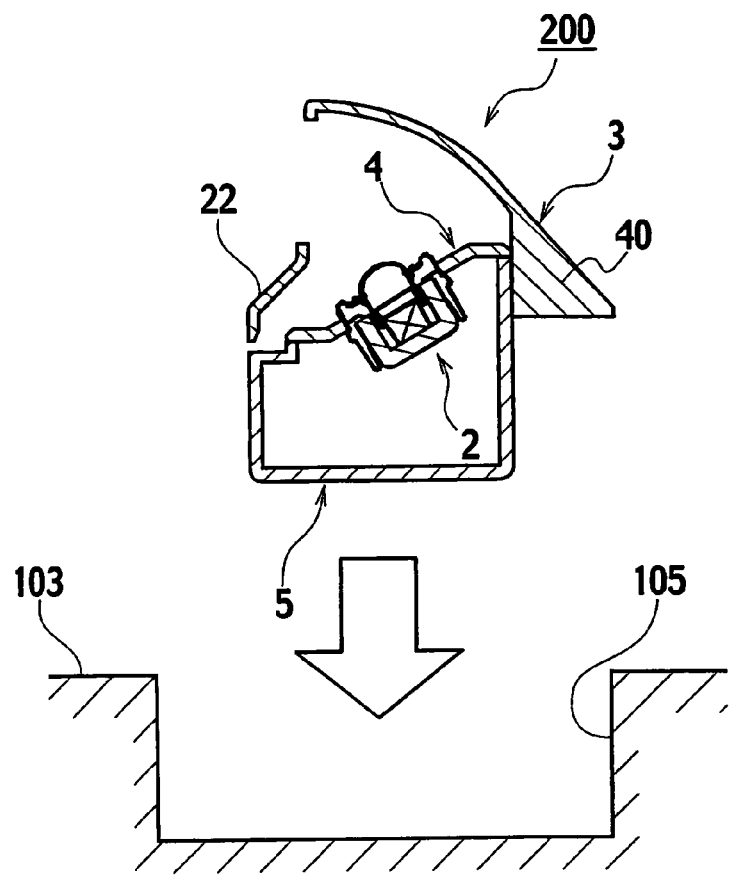
(b)
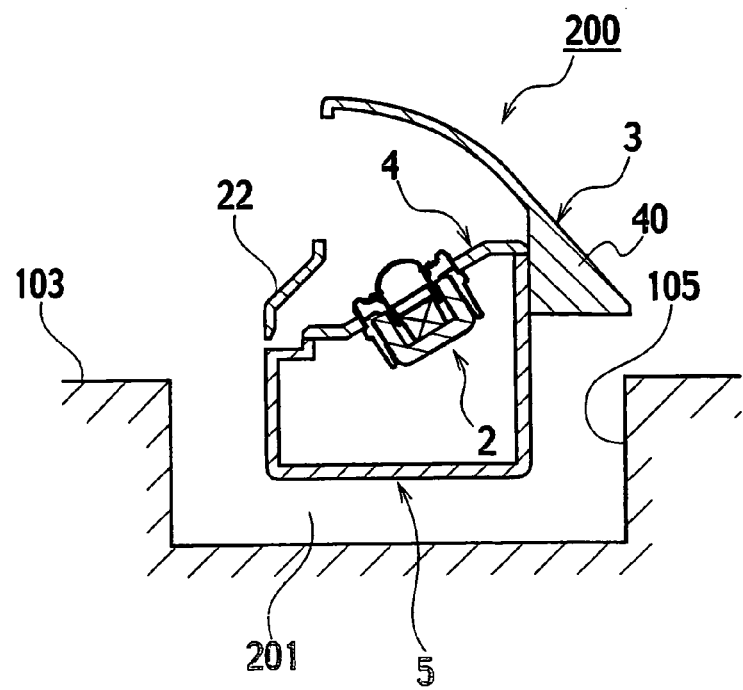

FIG. 24
(a) 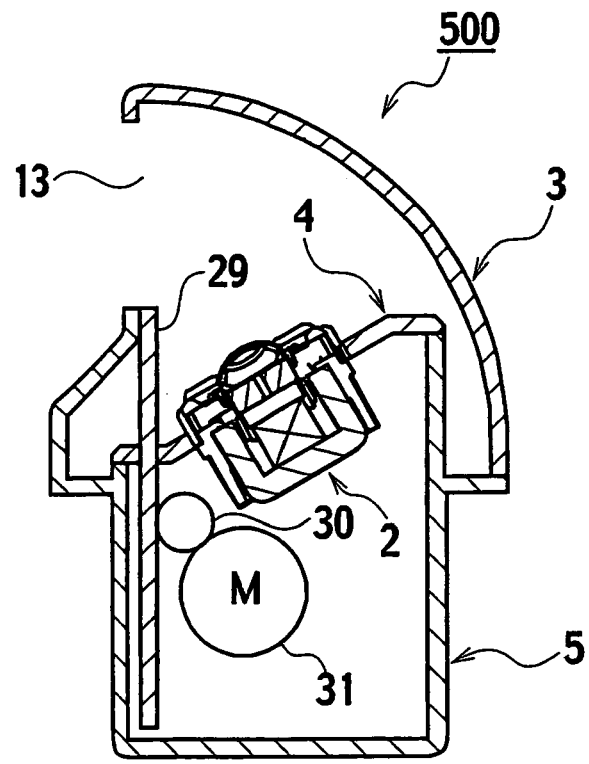
(b) 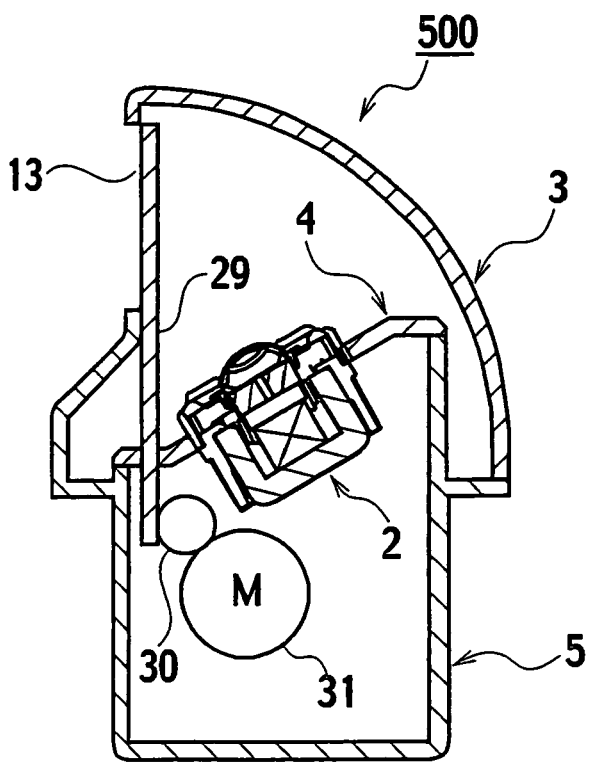

SPEAKER DEVICE, INSTALLATION BODY FOR SPEAKER DEVICE, AND MOBILE BODY HAVING SPEAKER DEVICE MOUNTED THEREON

TECHNICAL FIELD

The present invention relates to a speaker device suited to be used particularly in a strong wind, an installation body for the speaker device, and a mobile body having the speaker device mounted thereon.

BACKGROUND ART

An audio speaker device mounted on a two-wheeled motor vehicle has been conventionally installed in a front cowling of the two-wheeled motor vehicle. Since the front cowling can reduce a wind pressure acting on the speaker device and decrease an influence of the wind pressure on a speaker unit, the audio speaker device of this type has been popular as one that constitutes an audio system for a driver. Such a speaker device has been disclosed in, for example, Japanese Patent Application Laid-open No. 2000-228793 and Japanese Utility Model Laid-open No. S62-52586.

Recently, the regulations have been revised in Japan to permit tandem riding for riding a passenger on a rear seat of a two-wheeled motor vehicle on express highways. Accordingly, there has been a demand for installing a rear seat speaker device near the rear seat that enables a rear seat passenger to enjoy high quality sound.

However, if the speaker device is installed near the rear seat, high wind pressure acts on the speaker device due to lack of a windshield effect differently from installation of the speaker device in the front cowling. Due to this, a diaphragm of the speaker unit is forced inside by the wind pressure to make it difficult to produce sound. Furthermore, if this state continues for a long time, then a voice coil can possibly enter an overheated state and can be destroyed.

Moreover, such a problem occurs not only to the speaker device mounted on the two-wheeled motor vehicle but also any speaker device used in a strong wind.

DISCLOSURE OF INVENTION

The present invention has been achieved in view of the problems mentioned above, and it is an object of the invention to provide a speaker device having resistance against high wind pressure and a strong wind and capable of reproducing high quality sound.

To solve the problems mentioned above, the present invention provides (a) to (j) speaker devices, an installation body for the speaker device, and a mobile body having a speaker device mounted thereon as follows.

(a) A speaker device (100, 200, 300, 400, 500) used while attached to a mobile body (101), comprising: a speaker unit (2) including a diaphragm (6); a windshield cover (3) including an upper surface (30) formed without an opening and covering the speaker unit so as to block air flowing for the speaker device (100, 200, 300, 400) when the mobile body (101) moves, and including a sound emitting unit (130) emitting a sound produced by the speaker unit to an outside; and a cabinet (5) connected to a bottom of the windshield cover, and supporting the speaker unit so as to form an angle equal to or greater than 0 degree and equal to or smaller than 90 degree between a vibration direction of the diaphragm and a sound emission surface formed by the sound emitting unit.

(b) A speaker device (100, 200, 300, 400, 500) comprising: a speaker unit (2) including a diaphragm (6); a windshield cover (3) covering the speaker unit and including a sound emitting unit (130) emitting a sound produced by the speaker unit to an outside; and a cabinet (5) connected to a bottom of the windshield cover, and supporting the speaker unit so as to form an angle equal to or greater than 0 degree and equal to or smaller than 90 degree between a vibration direction of the diaphragm and a sound emission surface formed by the sound emitting unit, wherein the windshield cover (3) includes a protrusion (22) connected to a cabinet-side end of the sound emitting unit and inclined to be located outward of the windshield cover relative to a surface formed by the sound emitting unit.

(c) The speaker device (100, 200, 300, 400, 500) according to (a) or (b), further comprising a vent hole (19) causing air to circulate between inside the windshield cover and outside of the speaker device.

(d) The speaker device (100, 200, 300, 400) according to (c), comprising an air trunk (26) provided to surround a side surface and a bottom of the cabinet and causing the air flowing around the speaker device to flow around the cabinet when the speaker device is moved.

(e) The speaker device (400) according to any one of (a) to (d), wherein a surface (3a) of the windshield cover (3) on which the windshield cover faces the speaker unit is convex toward the diaphragm.

(f) An installation body for installing a speaker device (100, 200, 300, 400, 500) including a speaker unit (2) including a diaphragm (6); a windshield cover (3) covering the speaker unit and including a sound emitting unit (130) emitting a sound produced by the speaker unit to outside; and a cabinet (5) connected to a bottom of the windshield cover, and supporting the speaker unit, the installation body comprising: a concave portion (105) away from the cabinet at a predetermined distance, wherein a space formed between the cabinet and the concave portion functions as an air trunk (26, 108, 201) causing air flowing around the speaker device when the installation body installing the speaker device thereon is moved to flow around the cabinet.

(g) The installation body according to (f), comprising a support (106) attached to the concave portion while being bonded to the concave portion, wherein the air trunk is formed between the cabinet and the support.

(h) The installation body according to (f), comprising a support (107) provided in the concave portion while being bonded to the cabinet, wherein the air trunk is formed between the cabinet and the concave portion.

(i) The installation body according to any one of (f) to (h), wherein the installation body is a trunk (103) of a mobile body (101).

(j) A mobile body (101) on which the installation body according to any one of (f) to (i) is mounted.

BRIEF DESCRIPTION OF THE DRAWINGS

FIG. 14 is a longitudinal sectional view showing an installation body according to the first embodiment.

FIG. 18 is a longitudinal sectional view showing an installation body according to a second embodiment.

FIG. 19 is a longitudinal sectional view showing an installation body according to a third embodiment.

FIG. 24 is an explanatory diagram for an operation performed by the speaker device according to the fifth embodiment.

BEST MODE FOR CARRYING OUT THE INVENTION

Figure 1:
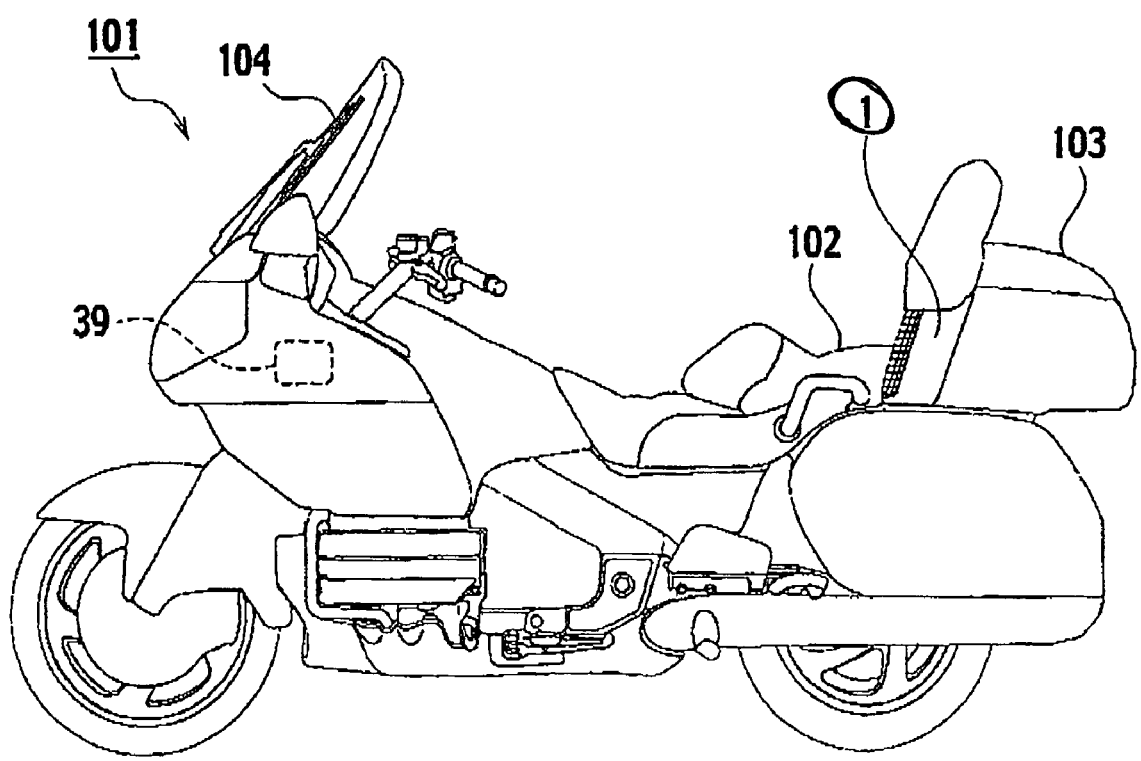
FIG. 1 is a side view of a two-wheeled motor vehicle having a speaker device mounted thereon.

FIG. 1 is a side view of a two-wheeled motor vehicle 101 on which a speaker device 100 according to one embodiment of the present invention is mounted. The speaker device 100 is mounted on the two-wheeled motor vehicle 101 while being buried in each of left and right sides of a front surface of a trunk 103 provided in rear of a rear seat 102, as will be described later with reference to FIGS. 2 and 3. Each speaker device 100 is connected to an audio device 39 positioned in a front cowling 104 of the two-wheeled motor vehicle 101 via a cable, and a volume and the like are controlled.

Figure 2:
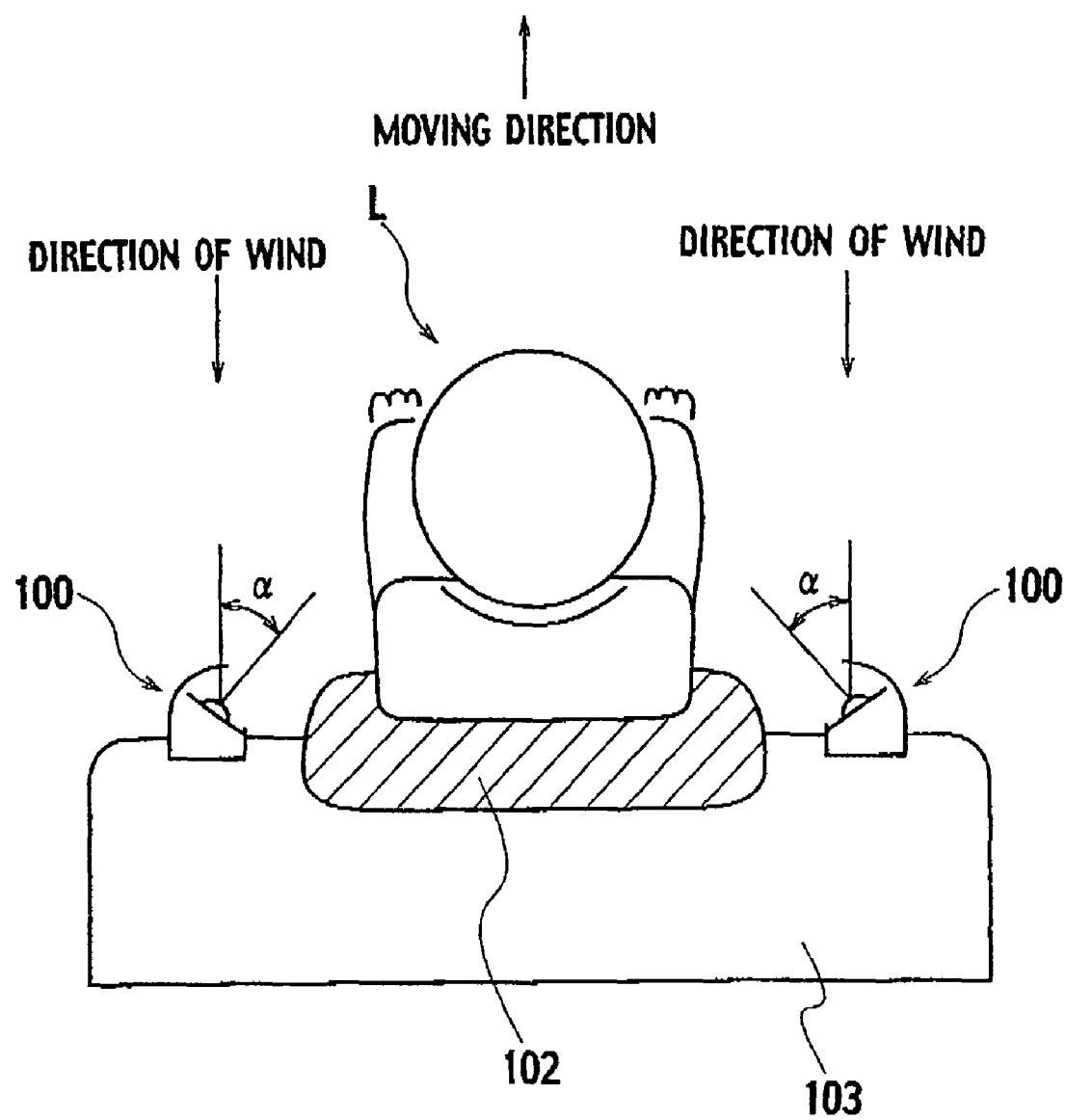
FIG. 2 is a schematic diagram of principal parts of the two-wheeled motor vehicle viewed from above.

FIG. 2 is a schematic diagram of principal parts of the two-wheeled motor vehicle 101 viewed from above. The speaker devices 100 are installed to the trunk 103 so as to be located on left and right sides of a listener L sitting on the rear seat 102, respectively.

Figure 3:
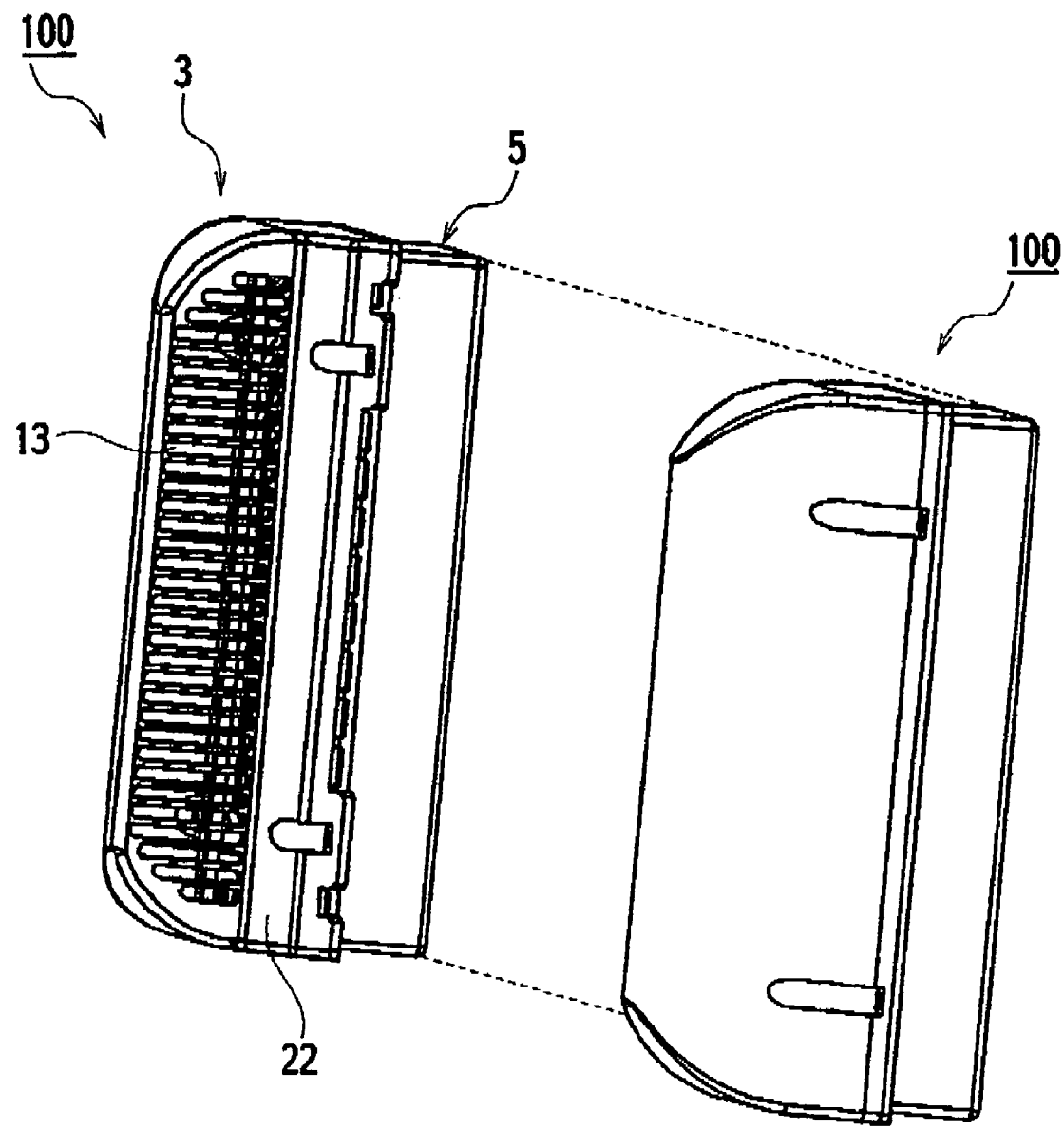
FIG. 3 is a perspective view of a pair of speaker devices according to a first embodiment.

FIG. 3 is a perspective view of a pair of speaker devices 100. Each of the speaker devices 100 includes a windshield cover 3 including sound emission windows 13 and a protrusion 22, and a cabinet 5 connected to a lower end of the windshield cover 3. A vertical direction refers to a vertical direction shown in FIG. 4 to be described later. The speaker device 100 will be described later in detail with reference to FIGS. 4 to 6.

Furthermore, as shown in FIG. 2, the speaker device 100 is mounted on the two-wheeled motor vehicle 101 on each of the left and right sides of the rear seat 102 so that an opening surface of the sound emission window 13 of the windshield cover 3 is almost in parallel to a moving direction of the two-wheeled motor vehicle 101. As described later, the speaker device 100 is configured to make it difficult for an outdoor airflow generated with driving of the two-wheeled motor vehicle 101 to enter the windshield cover 3 from the sound emission window 13.

Figure 4:
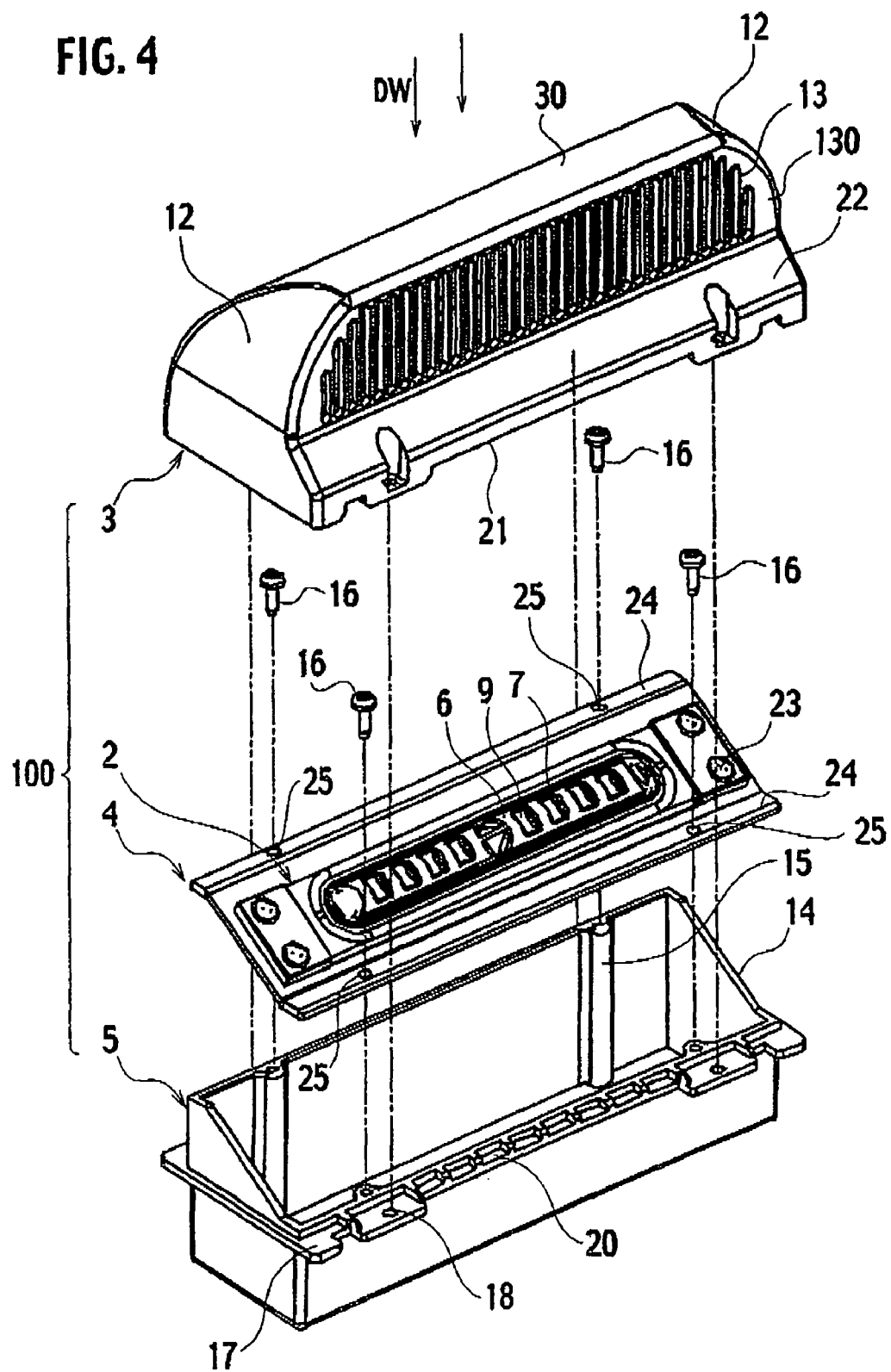
FIG. 4 is an exploded perspective view of the speaker device according to the first embodiment.

FIG. 4 is an exploded perspective view of the speaker device 100. The windshield cover 3 is a hollow cover formed by die-casting, injection molding or the like and having an open bottom. The windshield cover 3 is configured to include an upper surface 30, a sound emitting unit 130 having a plurality of slit-like sound emission windows 13 formed therein, a protrusion 22 formed integrally with a lower end of the sound emitting unit 130, and curved side surfaces 12 formed on both sides of the sound emitting unit 130 and the protrusion 22, respectively.

The upper surface 30 having a curved line along the side surfaces 12 enables the air from a direction DW to flow smoothly.

The protrusion 22 is provided to be inclined from an end (an upper side end) connected to the lower end of the sound emitting unit 130 to an opposite end (a tip end portion) constituting a side of the bottom of the windshield cover 3. The protrusion 22 is inclined at such an angle as to locate the tip end portion outward of the windshield cover 3 relative to the sound emitting unit 130. Further, a notch 21 is formed on a part of the tip end of the protrusion 22.

Each of the sound emission windows 13 is a rectangular window with corners rounded off and elongated in a perpendicular direction to the bottom of the windshield cover 3. The sound emission windows 13 are arranged at certain intervals in a longitudinal direction of the sound emitting unit 130. The shape of the sound emission windows 13 is not limited to that according to the present embodiment but can be the other shape such as a mesh shape. Furthermore, a saran net or the like can be provided on the sound emitting unit 130.

The cabinet 5 is connected to the bottom of the windshield cover 3. The cabinet 5 is a substantially box-like cabinet with an open surface set as an upper surface, and the upper surface is inclined at a predetermined angle with respect to a bottom of the cabinet 5. A flange 17 projecting vertically to an outer surface of a sidewall 14 of the cabinet 5 is formed on entire periphery of the outer surface of the sidewall 14. A plurality of screw holes 18 into which screws (not shown) for securing the windshield cover 3 is screwed is formed in the flange 17. Further, a plurality of holes 20 for forming vent holes 19 (see FIG. 6) discharging outdoor air flowing from the sound emission windows 13 into the windshield cover 3 outward or for absorbing the outside air if an internal pressure of the windshield cover 3 is negative is formed in the flange 17.

A plurality of cylindrical ribs 15 extending in a perpendicular (vertical) direction to the bottom of the cabinet 5 is formed on an inner surface of the sidewall 14 of the cabinet 5. Tapping screws 16 for securing a speaker support 4 are screwed into the respective ribs 15.

The speaker support 4 is a rectangular plate support a central portion of which is open so as to be able to attach a speaker unit 2 to the central portion (or to be able to support the speaker unit 2 by the central portion). Both side ends of the speaker support 4 in parallel to a longitudinal direction of the speaker support 4 are bent to be parallel to each other, thus forming an attachment portion 24 attached to the cabinet 5. A plurality of penetrating holes 25 is formed in a longitudinal direction on the attachment portion 24 at intervals, and shafts of the tapping screws 16 for attaching the speaker support 4 to the cabinet 5 penetrate the respective penetrating holes 25.

The speaker unit 2 is attached to an opening of the speaker support 4 and secured by screw holes (not shown) provided on both sides of the opening via screws 23. The speaker unit 2, which is direct-drive full-range reproduction speaker unit, includes a diaphragm 6.

The diaphragm 6 has a rectangular shape with corners rounded off from a viewpoint in a vibration direction X (see FIG. 6) of the diaphragm 6. A plurality of reinforcement recesses 9 is formed at intervals in a longitudinal direction of the diaphragm 6 so as to prevent the diaphragm 6 from being deformed during vibration and to be able to obtain high grade sound.

Figure 5:
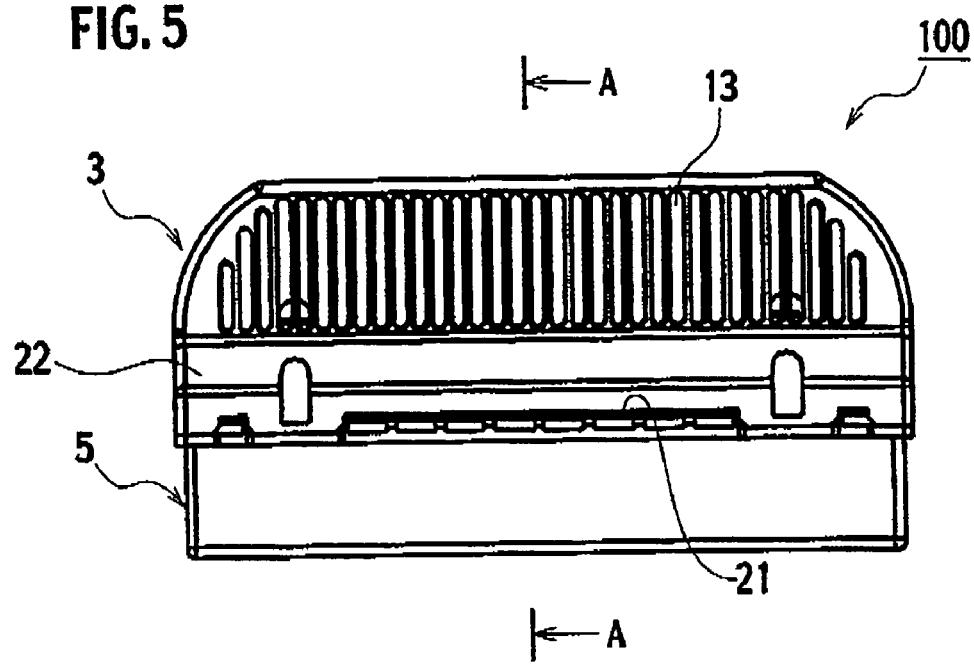
FIG. 5 is a front view of the speaker device according to the first embodiment.

By forcing the cabinet 5 into the opening of the bottom of the windshield cover 3 from upper end side, the speaker device 100 shown in FIG. 5 is obtained. FIG. 5 is a front view of the speaker device 100.

Figure 6:
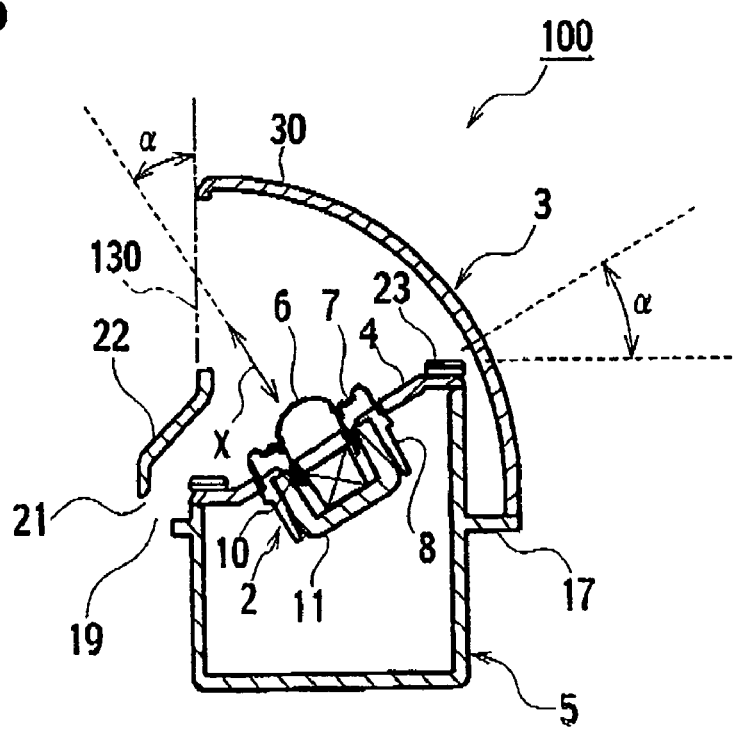
FIG. 6 is a cross-sectional view of the speaker device taken along a line A-A of FIG. 5 according to the first embodiment.

FIG. 6 is a cross-sectional view of the speaker device 100 taken along a line A-A of FIG. 5.

As shown in FIG. 6, the flange 17 abuts on a peripheral edge of the bottom of the windshield cover 3, so that the cabinet 5 is positioned relatively to the windshield cover 3. The upper surface 30 has a circular arc-shaped cross section so that the cross section appears a convex when viewed from the bottom and the sound emitting unit 130 of the cabinet 5. A two-dot chain line shown in FIG. 6 indicates a sound emission plane formed by the sound emitting unit 130.

The notch 21 formed on the tip end of the protrusion 22 together with the holes 20 formed in the flange 17 forms the vent holes 19. The air in the windshield cover 3 is attracted outside via the vent holes 19 or the outside airflows into the windshield cover 3 to promote the regulation of the internal pressure of the windshield cover 3.

An outer periphery of the diaphragm 6 of the speaker unit 2 is elastically supported by a frame 8 via an annular edge 7, so that the diaphragm 6 can vibrate in an arrow X direction. A voice coil 10 is connected to a lower end of the diaphragm 6 over its entire circumference and loosely inserted into a magnetic gap formed in a magnetic circuit 11. If a current is carried across the voice coil 10, the diaphragm 6 vibrates in the arrow X direction and produces sound waves. Since the diaphragm 6 is formed into the shape elongated and extending in a direction orthogonal to the vibration direction X (i.e., the rounded-off rectangular shape), the speaker unit 2 has directivity emitting sound waves radially around a longitudinal axis and can, therefore, exhibit high efficiency and favorable frequency characteristics.

The speaker unit 2 is secured to the opening of the speaker support 4 so that the magnetic circuit 11 protrudes toward the cabinet 5. Furthermore, the speaker unit 2 is supported by the cabinet 5 via the speaker support 4 so that the diaphragm 6 faces the sound emitting unit 130 (sound emission windows 13) and so that the vibration direction X of the diaphragm 6 is inclined at a predetermined angle $\alpha$ with respect to the sound emitting unit 130.

The inclination angle $\alpha$ of the vibration direction X of the diaphragm 6 with respect to the sound emitting unit 130 is defined as follows. The inclination angle $\alpha$ is defined as 0 degree, i.e., $\alpha=0$ degree if the vibration direction X of the diaphragm 6 is perpendicular to the bottom of the cabinet 5 and parallel to the sound emitting unit 130. The inclination angle $\alpha$ is defined as 90 degrees, i.e., $\alpha=90$ degree if the vibration direction X of the diaphragm 6 is parallel to the bottom of the cabinet 5 and perpendicular to the sound emitting unit 130.

It is necessary to provide the diaphragm 6 so that the angle $\alpha$ is equal to or greater than 0 degree and equal to or smaller than 90 degrees. By setting the angle $\alpha$ is equal to or greater than 0 degree and equal to or smaller than 90 degrees, the sound waves output from the speaker unit 2 can be easily emitted from the sound emitting unit 130.

Next, an influence of the angle $\alpha$ on sound is considered while changing the angle $\alpha$ in a range from 0 degree to 90 degrees. The speaker unit 2 and the speaker support 4 are sequentially made closer to each other so as to be parallel to the sound emitting unit 130 and allowed to be supported by the cabinet 5, and the angle $\alpha$ is increased.

If the angle $\alpha$ is set to 0 degree, the diaphragm 6 vibrates in parallel to the sound emitting unit 130. Due to this, most of the sound is reflected by the windshield cover 3 and emitted from the sound emitting unit 130. Accordingly, the sound directly emitted from the sound emitting unit 130 is only part of the entire sound and sound emission efficiency is low. Considering these, the angle $\alpha$ is preferably greater than 0 degree.

As shown in FIG. 2, it is also preferable to set the angle $\alpha$ so that a sound emission direction is generally equal to a direction of the head of the listener L. Accordingly, when the angle $\alpha$ is set to 90 degrees, the sound is emitted in the perpendicular direction to the sound emitting unit 130 and emitted, therefore, from just beside the listener L. As a result, the listener L cannot listen well to the emitted sound. The angle $\alpha$ is, therefore, preferably smaller than 90 degrees.

Figure 7:
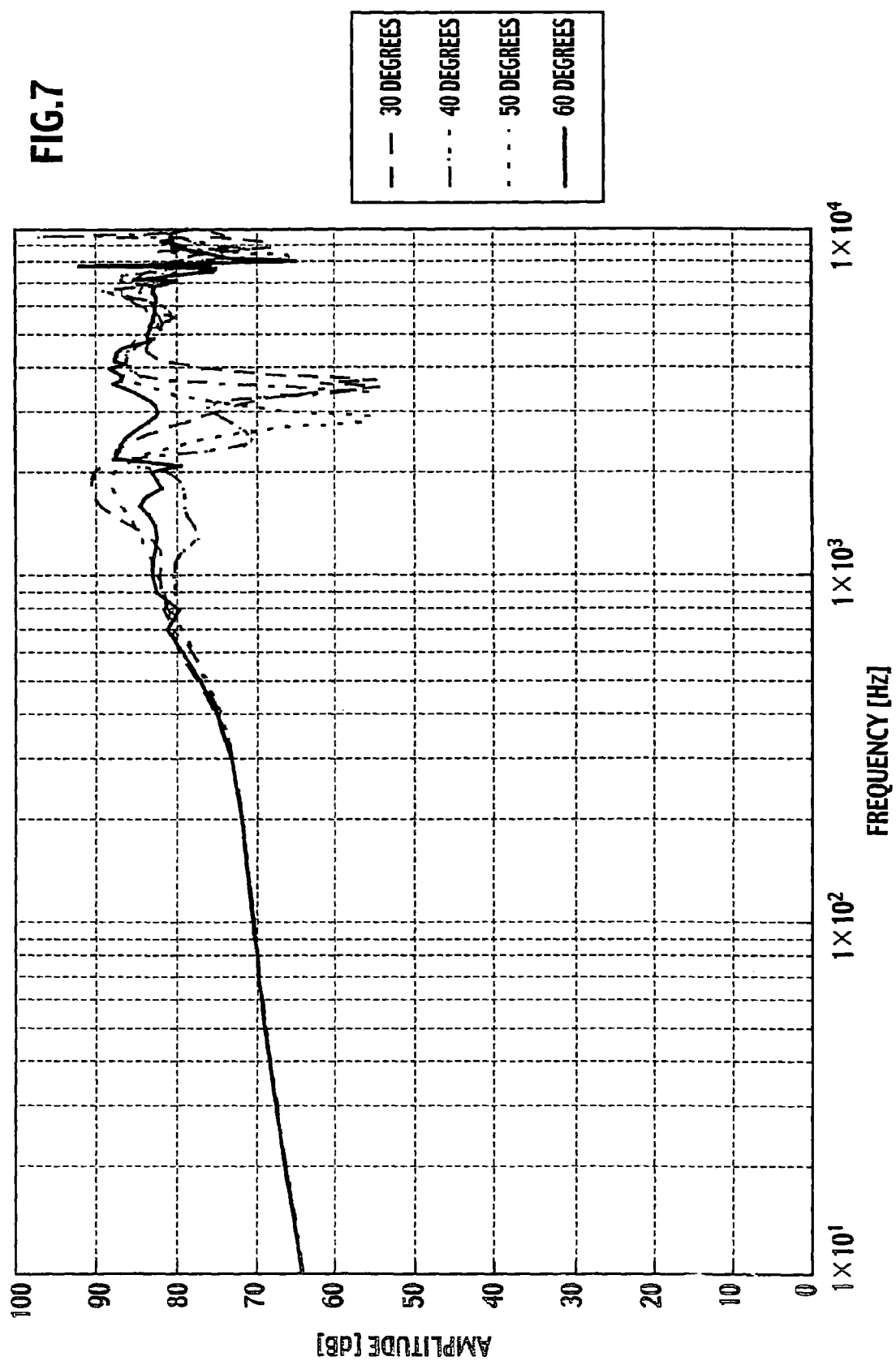
FIG. 7 is a chart showing frequency characteristics.

FIG. 7 shows the frequency characteristics when the angle $\alpha$ ranges from 30 degrees to 60 degrees. In FIG. 7, the horizontal axis indicates frequency [Hz] and the vertical axis indicates amplification factor [dB].

As is obvious from FIG. 7, an amplification factor dropped to about 40 dB at the frequency near 3 kHz is changed to about 80 dB and tends to be improved when the angle $\alpha$ is increased to be closer to 90 degrees. Preferably, the angle $\alpha$ is set particularly to about 60 degrees because highest sound quality is obtained at around 60 degrees. Therefore, if the speaker support 4 is arranged to be inclined in parallel to the sound emitting unit 130 as much as possible so as to increase the inclination angle $\alpha$ of the vibration direction X of the diaphragm 6 with respect to the sound emitting unit 130, good sound is preferably obtained. Particularly, it is preferable that the angle $\alpha$ is set to greater than 50 degrees, resulting in improving the frequency characteristics.

It is, therefore, necessary to attach the diaphragm 6 so that the angle $\alpha$ with respect to the sound emitting unit 130 is equal to or greater than 0 degree and equal to or smaller than 90 degrees. Furthermore, by inclining the diaphragm 6 so that the vibration direction X of the diaphragm 6 has the angle $\alpha$ greater than 0 degree and smaller than 90 degree with respect to the sound emitting unit 130, it is possible to emit the sound from the sound emission windows 13 with acoustically higher sound quality at sufficient volume. Particularly by setting the angle $\alpha$ to be greater than 50 degrees and smaller than 90 degrees, the frequency characteristics can be improved and the excellent sound quality can be obtained.

In the present embodiment, as shown in FIG. 6, the sound emitting unit 130-side end of the upper surface 30 is located outward of the sound emitting unit 130-side end of the diaphragm 6. By doing so, the diaphragm 6 is completely covered with the windshield cover 3 and it is, therefore, possible to lessen the influence of the outside airflow generated with the driving of the two-wheeled motor vehicle 101 on the diaphragm 6.

It is, therefore, preferable to provide the sound emitting unit 130 so that the sound emitting unit 130-side end of the upper surface 30 is located outward of the sound emitting unit 130-side end of the diaphragm 6. In the present embodiment, the sound emitting unit 130 is formed to be flush with a side surface of the cabinet 5.

Meanwhile, if the speaker devices 100 are placed to be buried into a part of the trunk 103, a capacity of the trunk 103 is reduced by as much as the speaker devices 100. A capacity of the cabinet 5 is restricted to secure the capacity of the trunk 103. By arranging the speaker unit 2 to be inclined at the angle α with respect to the sound emitting unit 130 as described above, an internal capacity of the cabinet 5 can be made larger. By doing so, favorable bass characteristics can be achieved and music with high quality sound can be provided to the listener.

Figure 8:
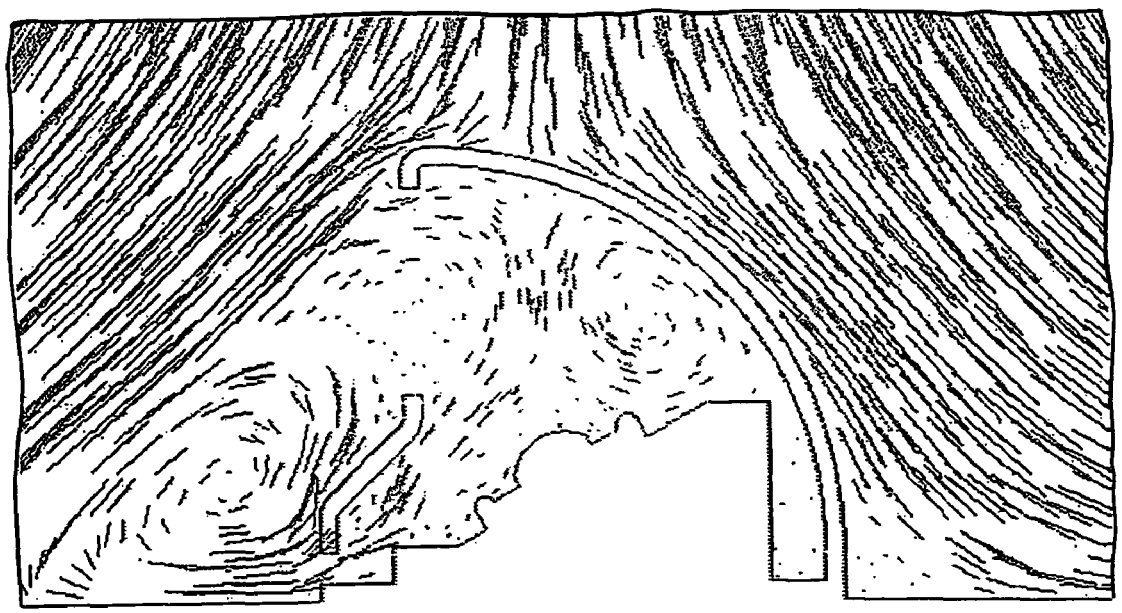
FIG. 8 shows a wind-tunnel test on the speaker device according to the first embodiment.
Figure 9:
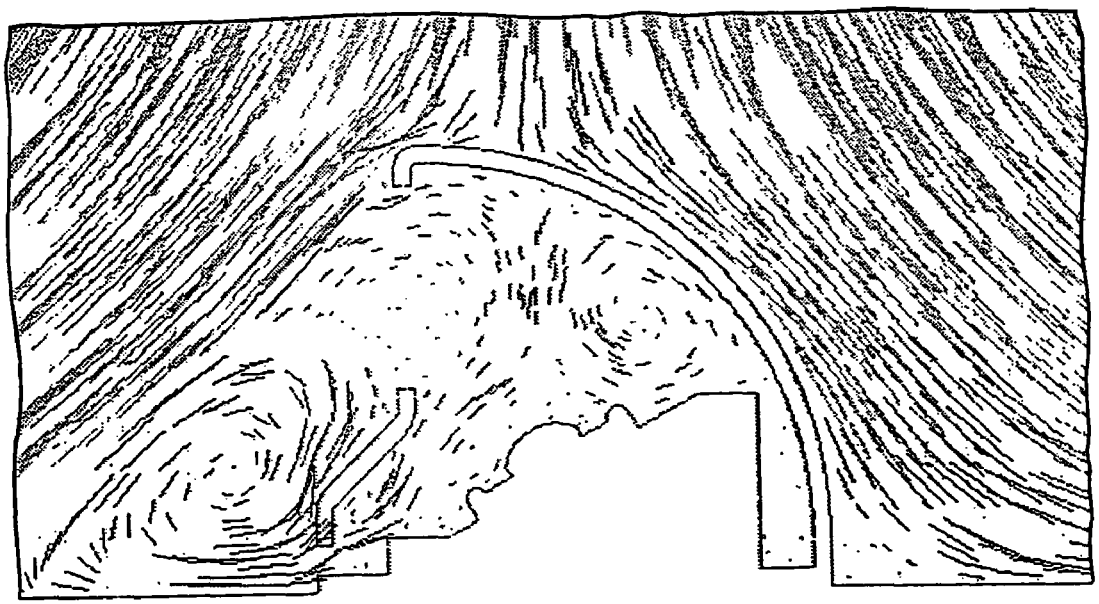
FIG. 9 shows the wind-tunnel test on the speaker device according to the first embodiment.
Figure 10:
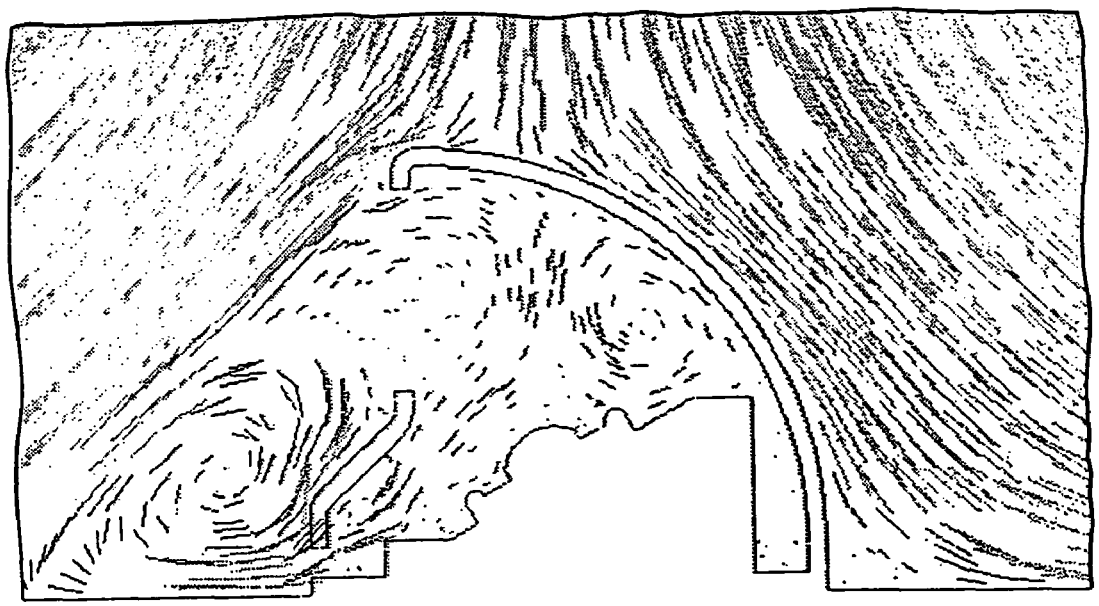
FIG. 10 shows the wind-tunnel test on the speaker device according to the first embodiment.

FIGS. 8 to 10 show vectorially states of an airflow generated around the speaker device 100 that catches the wind from the direction DW shown in FIG. 4 with the driving of the two-wheeled motor vehicle 101. A black part represents the airflow and a white part represents a state of windlessness. FIG. 8 shows the state at a wind velocity of 50 km/h, FIG. 9 shows the state at a wind velocity of 100 km/h, and FIG. 10 shows the state at a wind velocity of 180 km/h.

At any wind velocity, the airflow entering the windshield cover 3 is weak and a direction of the airflow hardly coincides with the vibration direction X of the diaphragm 6 of the speaker unit 2. It is, therefore, clear that the diaphragm 6 is in the state of being less forced inside by wind pressure.

Figure 11:
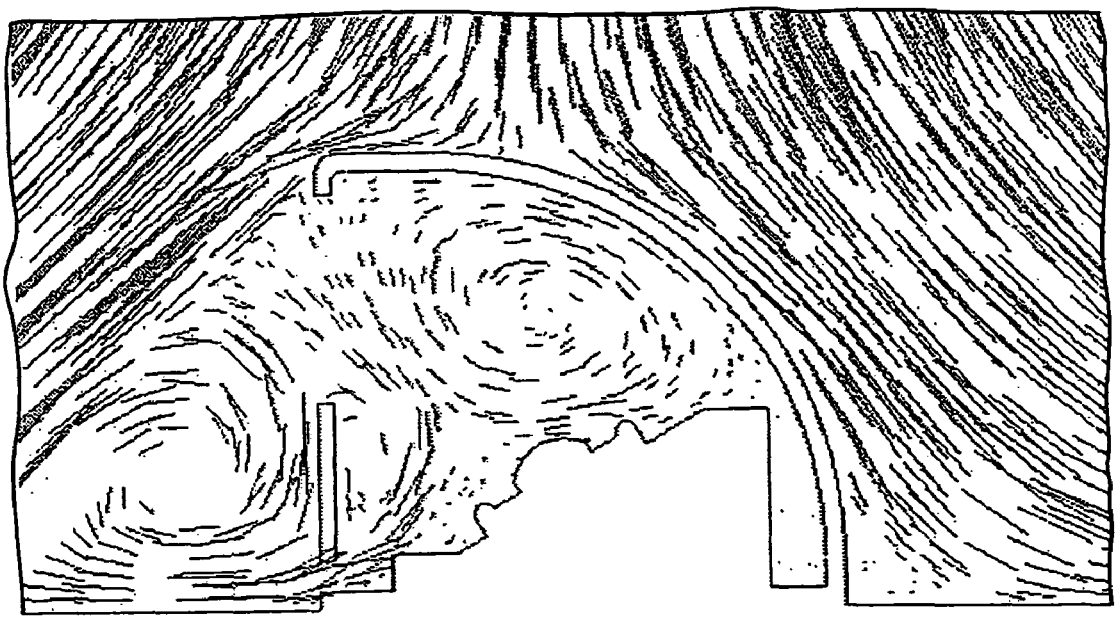
FIG. 11 shows a wind-tunnel test on the speaker device when the speaker device does not include a protrusion 22.
Figure 12:
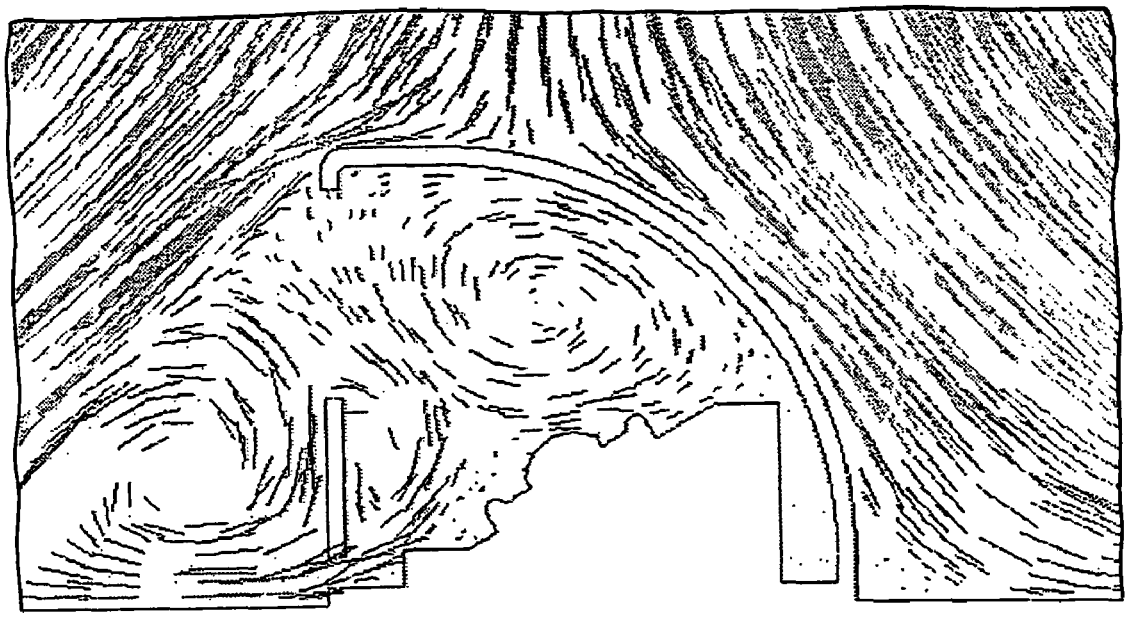
FIG. 12 shows the wind-tunnel test on the speaker device when the speaker device does not include a protrusion 22.
Figure 13:
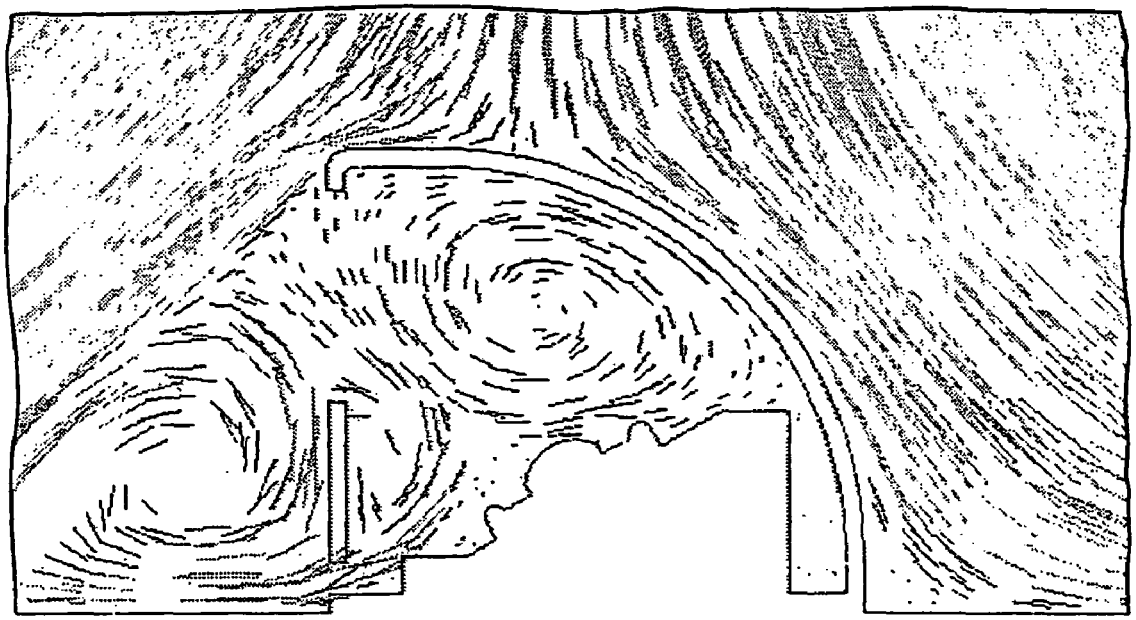
FIG. 13 shows the wind-tunnel test on the speaker device when the speaker device does not include a protrusion 22.

FIGS. 11 to 13 show cases where the windshield cover 3 does not include the protrusion 22 and where the wind velocity is 50 km/h, 100 km/h, and 180 km/h, respectively. At any wind velocity, the airflow entering the windshield cover 3 is weak and the diaphragm 6 is less forced inside by the wind pressure. However, a flow rate of the airflow in the windshield cover 3 is increased as compared with use of the speaker device 100 including the protrusion 22 according to the present embodiment.

It is, therefore, discovered that the airflow entering the windshield cover 3 is weakened by providing the protrusion 22 in the speaker device 100.

If the speaker device 100 according to the present embodiment catches the wind from the direction DW shown in FIG. 4, the flow of the wind (airflow) along the windshield cover 3 is accelerated at the protrusion 22 because of the inclined protrusion 22. Furthermore, the airflow accelerated at the protrusion 22 promotes incomings and outgoings of the air into and from the windshield cover 3 via the vent holes 19 constituted by the notch 21 of the protrusion 22.

The above features of the speaker device 100 enables the air in the windshield cover 3 to be absorbed outside via the vent holes 19 and the pressure of the air in the windshield cover 3 is appropriately regulated by the vent holes 19. It is, therefore, possible to reduce the wind pressure acting on the speaker unit 2 and to effectively prevent the sound from being produced poorly because of forcing the diaphragm 6 inside and the voice coil from being thermally destroyed.

Figure 15:
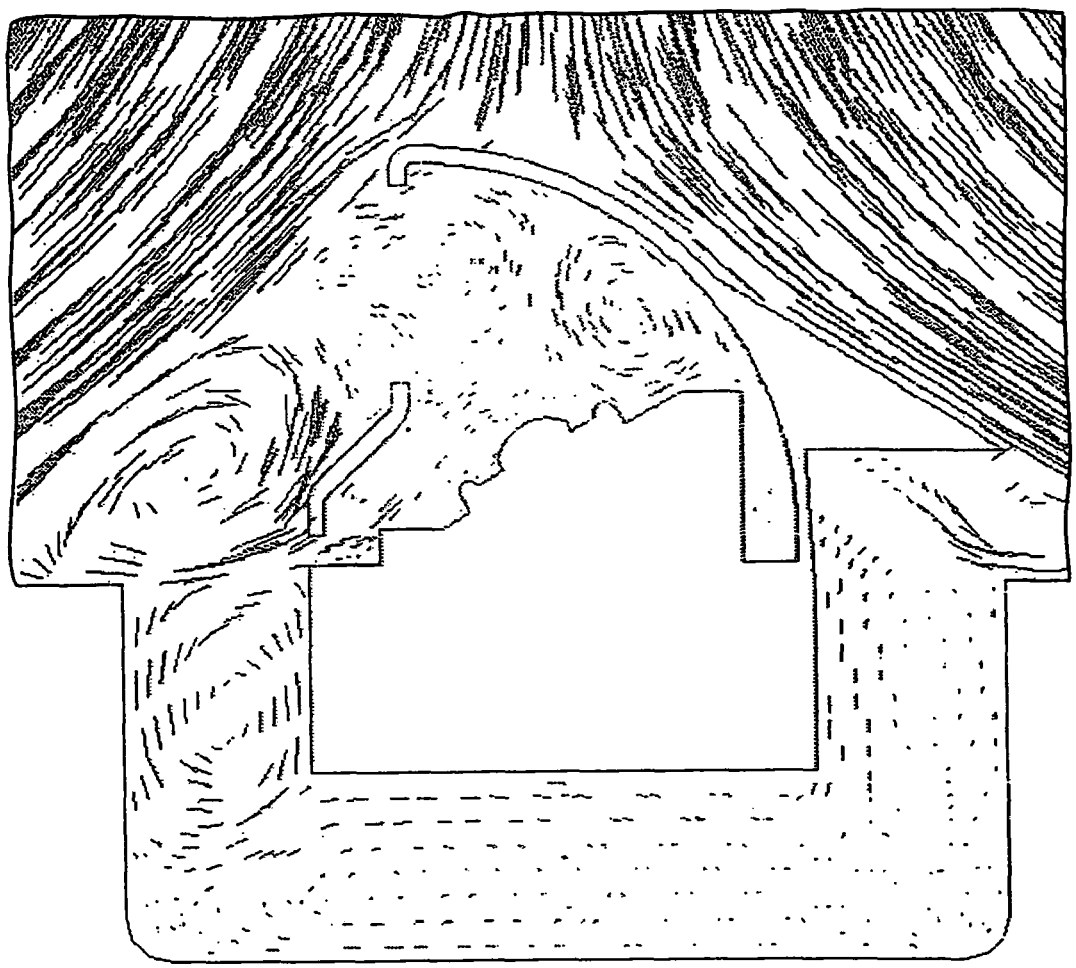
FIG. 15 shows a wind-tunnel test when the installation body according to the first embodiment is used.
Figure 16:
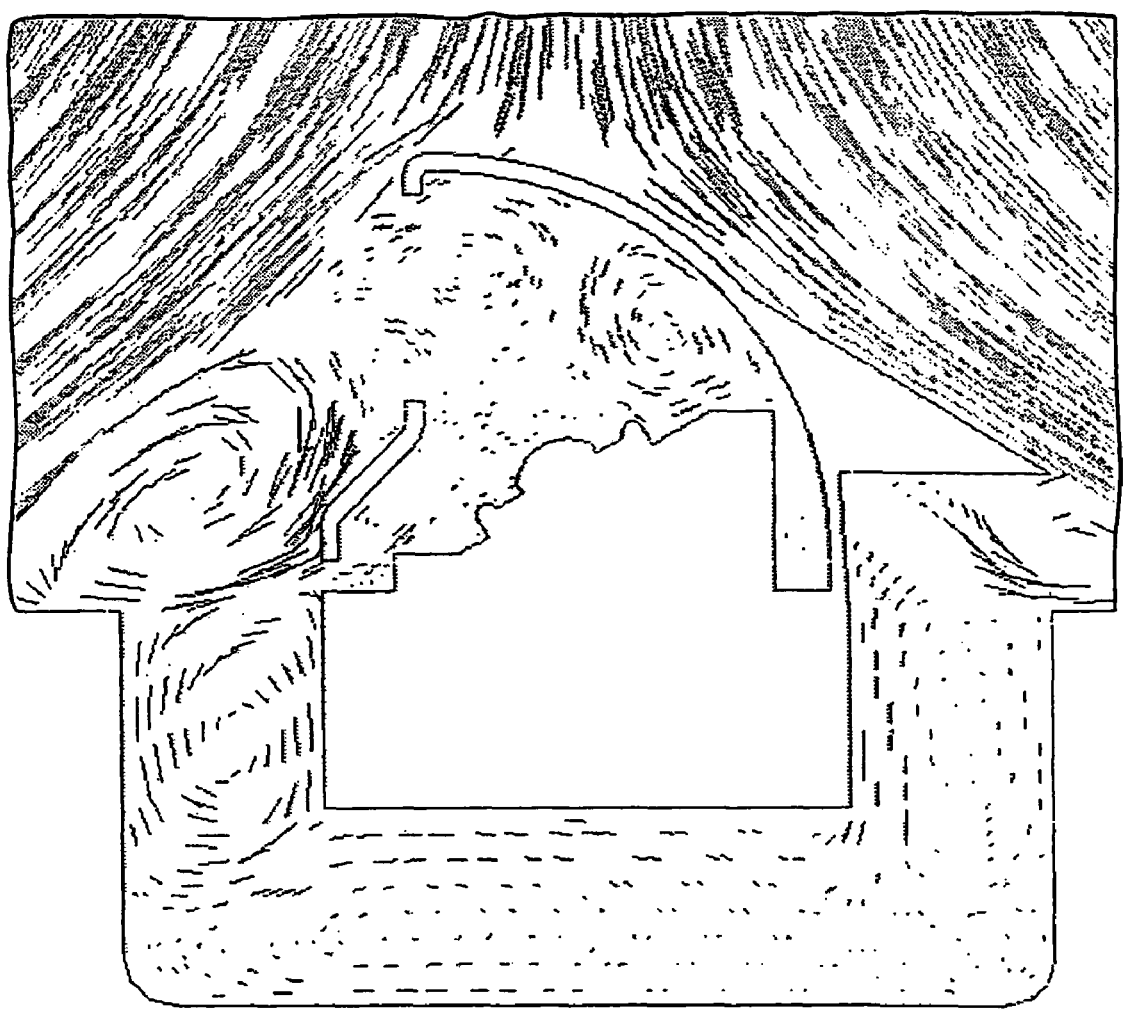
FIG. 16 shows the wind-tunnel test when the installation body according to the first embodiment is used.
Figure 17:
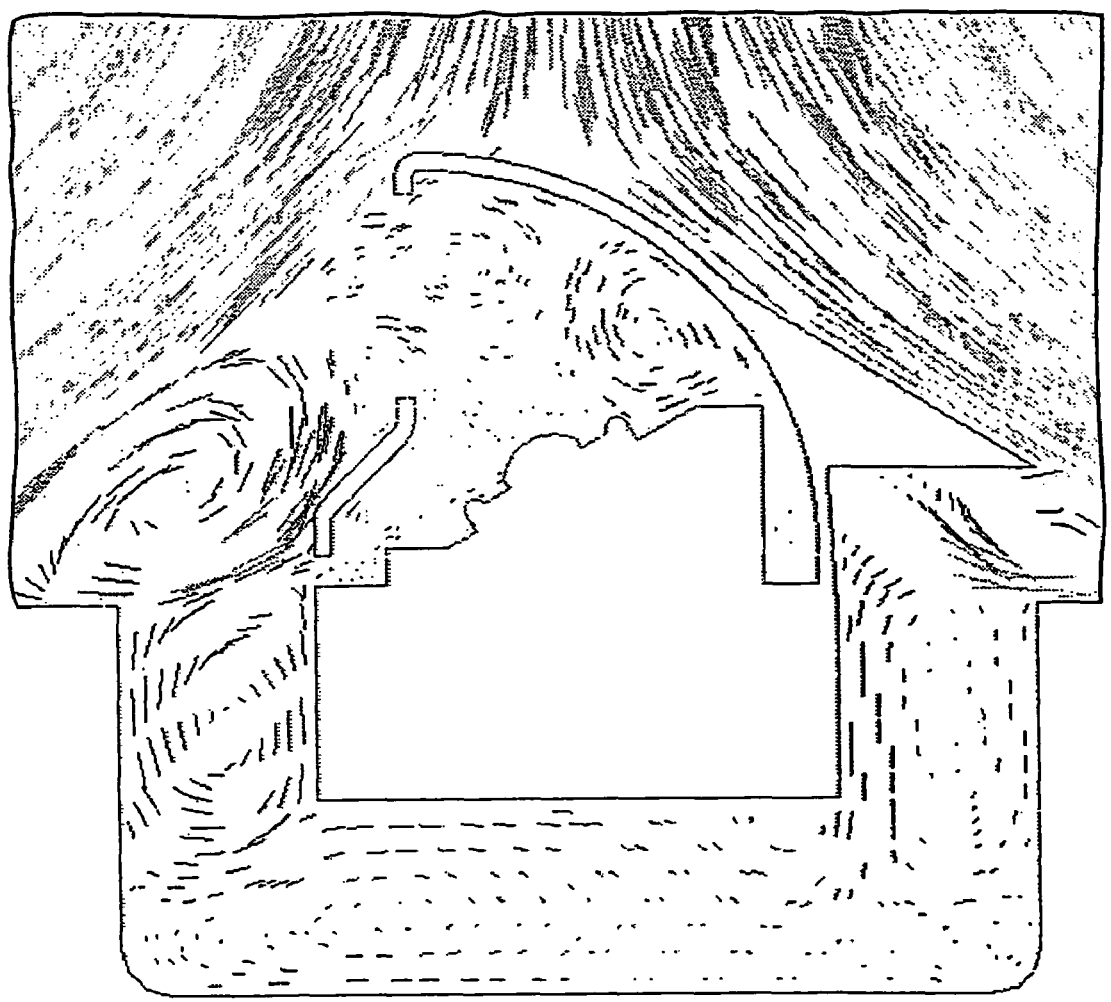
FIG. 17 shows the wind-tunnel test when the installation body according to the first embodiment is used.

FIGS. 14(a) and 14(b) are longitudinal sectional views of an installation body according to a first embodiment of the present invention for installing a speaker device 200 according to a second embodiment of the present invention on a two-wheeled motor vehicle 101. FIGS. 15 to 17 show wind-tunnel test results for the installation body according to the first embodiment. Like constituent elements of the speaker device 200 as those of the speaker device 100 shown in FIG. 6 are denoted by like reference symbols and descriptions thereof will be omitted.

The speaker device 200 shown in FIGS. 14(a) and 14(b) is configured so that a space 40 formed between a back-side side surface of the cabinet 5 and the upper surface 30 is filled up.

As shown in FIG. 14(a), the installation body according to the first embodiment includes a concave portion 105 formed in the trunk 103 and a speaker device support 106 attached to be bonded to the concave portion 105. The speaker device support 106 supports the speaker device 200 so as to surround the side surfaces and the bottom of the cabinet 5 and so as to locate the cabinet 5 apart from the speaker device support 106 at a predetermined distance.

A space generated between the cabinet 5 and the speaker device support 106 acts as an air trunk 26 introducing the air flowing along an outer surface of the protrusion 22 when the two-wheeled motor vehicle 101 moves, from the front surface side of the cabinet 5 toward the back side via the bottom thereof.

The speaker device support 106 can be attached to the concave portion 105 after being formed integrally with the speaker device 200. The speaker device 200 has, for example, at least one of both ends, shown in FIG. 4, supported by the speaker device support 106.

FIG. 14(b) shows that the speaker device 200 is installed on the two-wheeled motor vehicle 101 using the installation body according to the first embodiment.

FIGS. 15 to 17 show states of airflow around the speaker device 200 installed on the two-wheeled motor vehicle 101 by the installation body according to the first embodiment. FIG. 15 shows the state at a wind velocity of 50 km/h, FIG. 16 shows the state at a wind velocity of 100 km/h, and FIG. 17 shows the state at a wind velocity of 180 km/h.

As is obvious from FIGS. 15 to 17, the flow rate of the airflow in the windshield cover 3 is further reduced as compared with the cases of FIGS. 8 to 10 where the speaker device 100 according to the first embodiment is provided without the air trunk 26.

Therefore, if the speaker device support 106 supports the speaker device 200 so as to surround the side surfaces and bottom of the cabinet 5 and so as to locate the cabinet 5 apart from the speaker device support 106 at a predetermined distance, the air trunk 26 formed between the cabinet 5 and the speaker device support 106 enables the airflow along the outer surface of the protrusion 22 to flow more smoothly, the air in the windshield cover 3 is attracted by the vent holes 19 more easily, and the regulation of the internal pressure of the windshield cover 3 is further promoted.

Cases where the speaker device 200 according to the second embodiment is installed on the installation body according to the first embodiment and installation bodies according to subsequent embodiments are shown. Alternatively, the speaker to be installed device can be the speaker device 100 according to the first embodiment or one of speaker devices according to the subsequent embodiments.

FIG. 18(a) is a longitudinal sectional view of an installation body according to the second embodiment. Like constituent elements as those shown in FIG. 14 are denoted by like reference symbols and descriptions thereof will be omitted. The installation body according to the second embodiment includes a concave portion 105 formed in the trunk 103 and a speaker device support 107 supporting the speaker device 200. The speaker device support 107 is provided to be away from the concave portion 105 at a predetermined distance and supports the speaker device 200 while being bonded to the cabinet 5. A space formed between the speaker device support 107 and the concave portion 105 acts as an air trunk 108. The air trunk 108 exhibits advantages similarly to the air trunk 26 shown in FIG. 14(a).

The speaker device support 107 has dimensions to accommodate the cabinet 5, and side surfaces of the speaker device support 107 are provided to have such a height as not to disturb the flow of the air from the vent holes 19. The speaker device support 107 is supported, for example, by at least one of upper and lower ends of the trunk 103.

FIG. 18(b) shows that the speaker device 200 is installed on the two-wheeled motor vehicle 101 using the installation body according to the second embodiment.

FIG. 19(a) is a longitudinal sectional view of an installation body according to a third embodiment. Like constituent elements as those shown in FIG. 14 are denoted by like reference symbols and descriptions thereof will be omitted. The installation body according to the third embodiment includes a concave portion 105 formed in the trunk 103 and a speaker device support (not shown) provided, for example, on at least one of upper and lower ends of the trunk 103. The speaker device support supports the speaker device 200 so that an inner surface of the concave portion 105 surrounds the side surfaces and bottom of the cabinet 5 and is away from the cabinet 5 at a predetermined distance. A space formed between the cabinet 5 and the concave portion 105 acts as an air trunk 201. The air trunk 201 exhibits advantages similarly to the air trunk 26 shown in FIG. 14 (a).

FIG. 19(b) shows that the speaker device 200 is installed on the two-wheeled motor vehicle 101 using the installation body according to the third embodiment.

Figure 20:
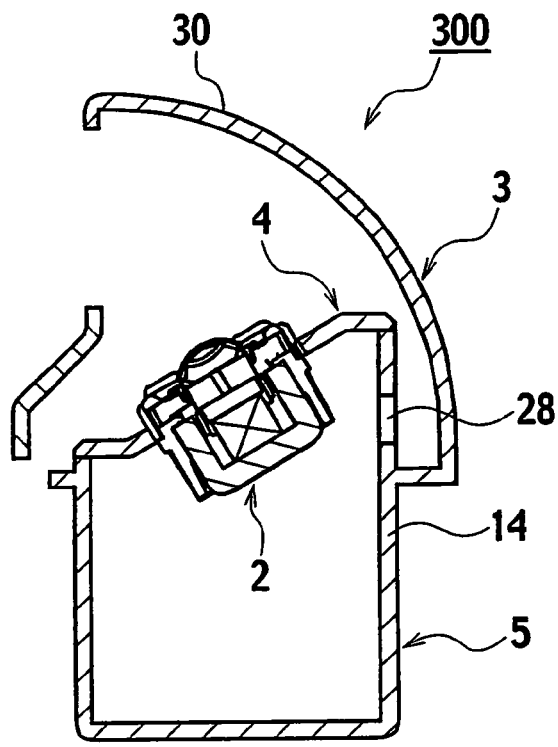
FIG. 20 is a diagram showing a speaker device according to the third embodiment.

FIG. 20 is a longitudinal sectional view of a speaker device 300 according to the third embodiment of the present invention. Like constituent elements of the speaker device 300 as those of the speaker device 100 shown in FIG. 6 are denoted by like reference symbols and descriptions thereof will be omitted.

In the speaker device 300, a penetrating hole 28 communicating an interior of the cabinet 5 with that of the windshield cover 3 is provided on the back-side side surface 14 of the cabinet 5.

If such a penetrating hole 28 is provided, an increase of the air pressure in the cabinet 5 can be released into the windshield cover 3 when the diaphragm 6 of the speaker unit 2 is unintendedly forced inward by the wind pressure. This can prevent occurrence of failures such as degradation in sound quality and improve reliability.

Moreover, the penetrating hole 28 is preferably formed to produce a bass-reflex effect. By so forming, bass characteristics can be improved and sound quality can be enhanced.

Alternatively, a valve operating according to a magnitude of the air pressure in the cabinet 5 can be provided in the penetrating hole 28. The penetrating hole 28 can be closed by the valve in an ordinary state and can be opened only if the diaphragm 6 is forced inside and the air pressure in the cabinet 5 is increased.

Figure 21:
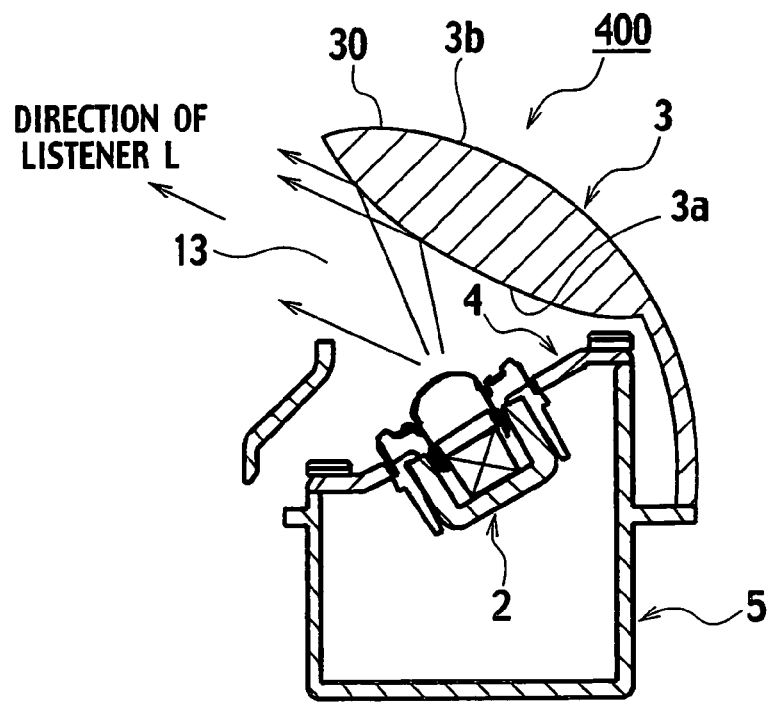
FIG. 21 is a diagram showing a speaker device according to a fourth embodiment.

FIG. 21 is a longitudinal sectional view of a speaker device 400 according to a fourth embodiment of the present invention. Like constituent elements of the speaker device 400 as those of the speaker device 100 shown in FIG. 6 are denoted by like reference symbols and descriptions thereof will be omitted.

In the speaker device 400, similarly to the other embodiments, an outer surface portion 3b of the upper surface 30 is formed to be substantially circular arc-shaped so as to have an upward (outward) convex cross section viewed from the bottom of the cabinet 5, and an inner surface portion 3a of the upper surface 30 is formed to be substantially circular arc-shaped so as to have a convex cross section toward the diaphragm 6 (toward inside).

The outer surface portion 3b is formed to allow the outside air to easily flow and to make it difficult to generate wind noise similarly to the other embodiments. By forming the inner surface portion 3a to be substantially circular arc-shaped to have the inward convex cross section, more sound waves produced from the speaker unit 2 can be reflected toward the sound emission windows 13, the sound pressure is increased, and auditory characteristics (sound quality and volume) can be improved.

Figure 22:
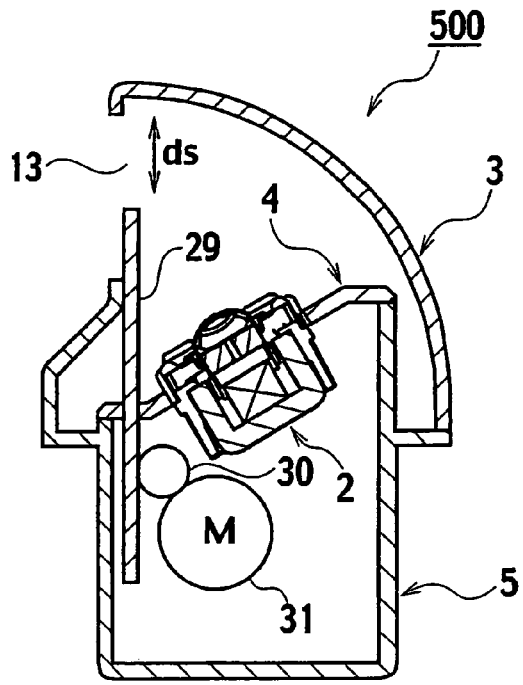
FIG. 22 is a diagram showing a speaker device according to a fifth embodiment.
Figure 23:
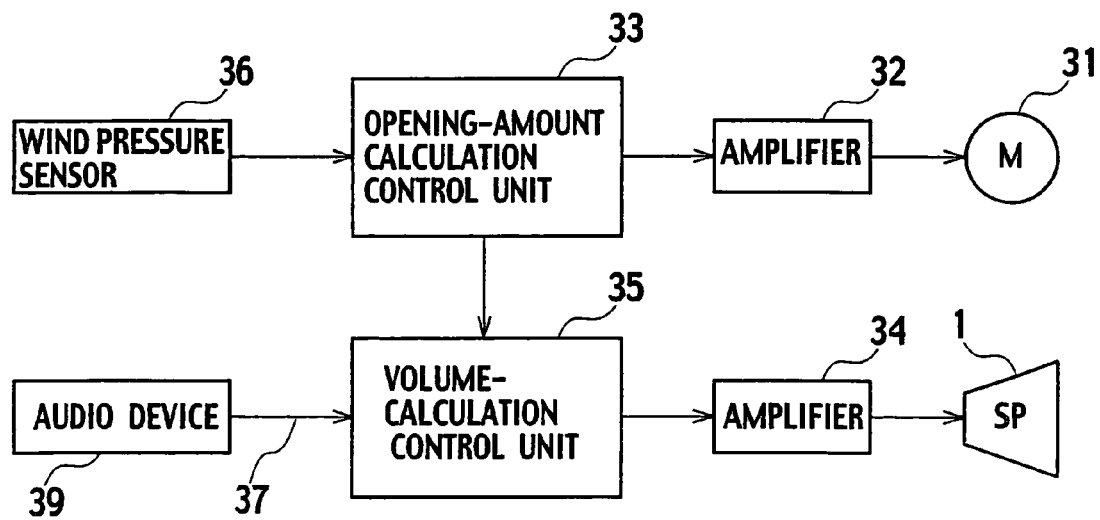
FIG. 23 is a schematic configuration diagram of a control system for the speaker device according to the fifth embodiment.

A speaker device 500 according to a fifth embodiment of the present invention is described next. FIG. 22 is a longitudinal sectional view of the speaker device 500 according to the fifth embodiment. FIG. 23 is a schematic configuration diagram of a control system for the speaker device 500 according to the fifth embodiment. FIG. 24 is an explanatory diagram for an operation performed by the speaker device 500. Like constituent elements of the speaker device 500 as those of the speaker device 100 shown in FIG. 6 are denoted by like reference symbols and descriptions thereof will be omitted.

As shown in FIG. 22, the speaker device 500 includes a shutter 29 opening or closing the sound emission windows 13. The shutter 29 is supported by the windshield cover 3 to be movable in a vertical direction ds, and connected to a motor 31 via an appropriate power transmission member 30 such as a gear. When the motor 31 is driven, the shutter 29 moves in the vertical direction ds. While a wind pressure sensor 36, to be described later, is provided near the speaker device 500, it is not shown in FIG. 22.

An opening amount of the shutter 29 is adjusted by the control system shown in FIG. 23, and a volume of the speaker device 500 is also adjusted according to various conditions.

As shown in FIG. 23, the motor 31 is connected to an opening-amount calculation control unit 33 via an amplifier 32, and the speaker device 500 is connected to a volume-calculation control unit 35 via an amplifier 34. The opening-amount calculation control unit 33 and the volume-calculation control unit 35 are connected to each other, and each of the control units 33 and 35 is constituted by a microcomputer including a CPU, a RAM, a ROM, and the like. Further, the opening-amount calculation control unit 33 is connected to the wind pressure sensor 36 placed near the speaker device 500, and the volume-calculation control unit 35 is connected to the audio device 39.

The opening-amount calculation control unit 33 controls the motor 31 based on a signal input from the wind pressure sensor 36 and on a program stored in the ROM or the like, and adjusts the opening amount of the shutter 29. The opening-amount calculation control unit 33 outputs the signal showing the opening amount to the volume-calculation control unit 35.

An audio signal 37 is input to the volume-calculation control unit 35 from the audio device 39. The volume-calculation control unit 35 controls the speaker device 500 based on a signal input from the opening-amount calculation control unit 33 and on the program stored in the ROM or the like to adjust a volume of the output sound.

In the fifth embodiment, the wind pressure sensor 36 detects a wind pressure near the speaker device 500, and the opening amount of the shutter 29 is controlled to be smaller as the wind pressure is higher. By doing so, it is possible to further ensure preventing the diaphragm 6 from being forced inside by the wind pressure. Moreover, if the shutter 29 is controlled to be fully closed when the wind pressure exceeds a certain predetermined value, the effect of preventing the diaphragm 6 from being forced inside by the wind pressure can be obtained. If output of an audio signal to the speaker device 500 is controlled to be stopped at the same time, it is possible to prevent wasteful consumption of power.

If a sensor (e.g., vehicle speed sensor) detecting a physical amount that can reason the wind pressure by analogy is used in place of the wind pressure sensor 36, the same advantages can be obtained.

Moreover, in the fifth embodiment, the volume is controlled to be higher as the opening amount of the shutter 29 is smaller. If the opening amount of the shutter 29 is smaller, then less sound is emitted outside and the wind noise is increased. However, by raising the volume, it is possible to prevent the sound reproduced by the speaker device 500 from being made less listenable to the listener L sitting on the rear seat 102.

Furthermore, if the shutter 29 is controlled to be opened only when the audio device 39 is turned on and to be fully closed when the audio device 39 is turned off, it is possible to completely prevent the diaphragm 6 from being forced inside by the wind pressure. It is also possible to prevent invasion of foreign matters into the speaker device 500 when the audio device 39 is not used and the speaker unit 2 from being damaged.

It suffices that the speaker device 500 includes at least the motor 31 and includes all of or one of means of the amplifier 32, the opening-amount calculation control unit 33, the amplifier 34, and the volume-calculation control unit 35.

FIG. 24(*a*) shows a state where the shutter 29 is moved in a direction of the bottom of the cabinet 5 (downward direction of the cabinet 5) and where the sound emission windows 13 are fully open. FIG. 24(*b*) shows a state where the shutter 29 is moved in an upward direction and where the sound emission windows 13 are fully closed.

While the speaker device and the installation body according to the present invention have been explained above with specific examples, the present invention is not limited to the above embodiments, and various modifications can be made to the above embodiments without departing from the scope of the present invention. In addition, the respective embodiments can be combined with each other appropriately. The constituent element to which each of the speaker devices 100, 200, 300, 400, and 500 (hereinafter, "each speaker device") is installed is not limited to the trunk 103 but each speaker device can be placed on or near the rear seat 102.

Further, the target to which each speaker device is applied is not limited to a mobile body such as the two-wheeled motor vehicle but each speaker device can be applied for disaster prevention purposes. For example, each speaker device can be applied to an instance of providing audio information against strong sea wind such as typhoon on the seashore. If each speaker device is positioned so that the windshield cover 3 is directed upwind and so that a wind blow direction is almost parallel to opening surfaces of the sound emission windows 13, the speaker unit 2 is not destroyed by the strong wind pressure and the audio information can be provided at reasonable volume with loud and clear sound.

The speaker device according to each of the embodiments of the present invention described so far can prevent the sound from being less listenable because the diaphragm 6 is forced inside by the wind pressure and the voice coil 8 from being thermally destroyed by providing the windshield cover 3. Moreover, the protrusion 22 and the vent holes 19 are provided or the air trunks 26, 108 and 201 are formed together with the installation body, whereby the frequency characteristics and the like are improved and the sound quality is enhanced.

INDUSTRIAL APPLICABILITY

According to the present invention, the speaker device can be used under high wind pressure and in a strong wind, and can reproducing high quality sound.

The invention claimed is:

1. A speaker device used while attached to a mobile body, comprising:
    a speaker unit including a diaphragm;
    a windshield cover including an upper surface formed without an opening and covering the speaker unit so as to block air flowing for the speaker unit when the mobile body moves, and including a sound emitting unit emitting a sound produced by the speaker unit to an outside; and
    a cabinet connected to a bottom of the windshield cover, and supporting the speaker unit so as to form an angle equal to or greater than 0 degree and equal to or smaller than 90 degree between a vibration direction of the diaphragm and a sound emission surface formed by the sound emitting unit.

2. The speaker device according to claim 1, wherein a surface of the windshield cover on which the windshield cover faces the speaker unit is convex toward the diaphragm.

3. The speaker device according to claim 1, further comprising a vent hole causing air to circulate between inside the windshield cover and outside of the speaker device.

4. The speaker device according to claim 3, comprising an air trunk provided to surround a side surface and a bottom of the cabinet and causing the air flowing around the speaker device to flow around the cabinet when the speaker device is moved.

5. A speaker device used while attached to a mobile body, comprising:
    a speaker unit including a diaphragm;
    a windshield cover including an upper surface formed without an opening and covering the speaker unit so as to block air flowing for the speaker device when the mobile body moves, and including a sound emitting unit emitting a sound produced by the speaker unit to an outside; and
    a cabinet connected to a bottom of the windshield cover, and supporting the speaker unit so as to form an angle equal to or greater than 0 degree and equal to or smaller than 90 degree between a vibration direction of the diaphragm and a sound emission surface formed by the sound emitting unit, wherein the windshield cover includes a protrusion connected to a cabinet-side end of the sound emitting unit and inclined to be located outward of a surface formed by the sound emitting unit.

6. The speaker device according to claim 5, wherein a surface of the windshield cover on which the windshield cover faces the speaker unit is convex toward the diaphragm.

7. The speaker device according to claim 5, further comprising a vent hole causing air to circulate between inside the windshield cover and outside of the speaker device.

8. The speaker device according to claim 7, comprising an air trunk provided to surround a side surface and a bottom of the cabinet and causing the air flowing around the speaker device to flow around the cabinet when the speaker device is moved.

9. An installation body for installing and supporting a speaker device, the speaker device comprising:
    a speaker unit including a diaphragm;
    a windshield cover covering the speaker unit and including a sound emitting unit emitting a sound produced by the speaker unit to outside; and
    a cabinet connected to a bottom of the windshield cover, and the installation body comprising:
    a concave portion away from the cabinet at a predetermined distance, wherein a space formed between the cabinet and the concave portion functions as an air trunk causing air flowing around the speaker device when the installation body installed with the speaker device is moved.

10. The installation body according to claim 9, comprising a support attached to the concave portion while being bonded to the concave portion, wherein the air trunk is formed between the cabinet and the support.

11. The installation body according to claim 9, comprising a support provided in the concave portion while being bonded to the cabinet, wherein the air trunk is formed between the cabinet and the concave portion.

12. The installation body according to claim 9, wherein the installation body is a trunk of a mobile body.

13. A mobile body on which the installation body according to claim 9 is mounted.

* * * * *